US010045345B2

United States Patent
Ma et al.

(10) Patent No.: US 10,045,345 B2
(45) Date of Patent: Aug. 7, 2018

(54) SYSTEMS AND METHODS FOR SELF-CONTAINED AIR INTERFACE PARTITIONS

(71) Applicant: Huawei Technologies Co., Ltd., Shenzhen (CN)

(72) Inventors: Jianglei Ma, Ottawa (CA); Lu Rong, Shanghai (CN); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 15/140,044

(22) Filed: Apr. 27, 2016

(65) Prior Publication Data
US 2017/0135102 A1    May 11, 2017

Related U.S. Application Data
(60) Provisional application No. 62/252,037, filed on Nov. 6, 2015.

(51) Int. Cl.
*H04W 72/04* (2009.01)
*H04W 72/12* (2009.01)
(Continued)

(52) U.S. Cl.
CPC ....... *H04W 72/0453* (2013.01); *H04L 1/1812* (2013.01); *H04L 5/001* (2013.01);
(Continued)

(58) Field of Classification Search
CPC ............. H04W 72/12; H04W 72/1205; H04W 72/1263; H04W 74/00; H04W 74/04; H04W 76/00; H04W 76/02; H04W 76/025
See application file for complete search history.

(56) References Cited

U.S. PATENT DOCUMENTS

2007/0211785 A1* 9/2007 Nakache ............. H04B 1/7156
375/136
2008/0013599 A1* 1/2008 Malladi ................ H04L 5/0007
375/132
(Continued)

FOREIGN PATENT DOCUMENTS

CN      101944971 A     1/2011
CN      104685821 A     6/2015

OTHER PUBLICATIONS

Ericsson, "5G—Key Component of The Networked Society," RWS-150009, 3GPP RAN Workshop on 5G, Phoenix, AZ, USA, Sep. 17-18, 2015, pp. 1-55.

Primary Examiner — Ashley Shivers
(74) Attorney, Agent, or Firm — Slater Matsil, LLP (57) ABSTRACT

Signal processing complexity in fifth generation (5G) networks can be reduced by communicating wireless signals over self-contained partitions of a carrier such that the wireless transmission communicated over each self-contained partition of the carrier includes all physical control channel signaling required to decode data carried in a physical data channel of the partition. The control signaling may include resource assignment within the partition, modulation and coding scheme indication, reference signal configuration and retransmission information. In some embodiments, an anchor partition of a carrier is used to communicate initial access information for self-contained partitions of the carrier. The initial access information may include center-frequencies, bandwidths, and/or air interface configurations of the self-contained partitions. The anchor partition may also carry load indications associated with the self-contained partitions.

27 Claims, 4 Drawing Sheets

(51) Int. Cl.
  *H04W 76/15* (2018.01)
  *H04L 1/18* (2006.01)
  *H04L 5/00* (2006.01)
  H04W 88/02 (2009.01)
  H04W 88/08 (2009.01)

(52) U.S. Cl.
  CPC ....... *H04W 72/1263* (2013.01); *H04W 76/15* (2018.02); *H04W 88/02* (2013.01); *H04W 88/08* (2013.01)

(56) References Cited

U.S. PATENT DOCUMENTS

| | | |
|---|---|---|
| 2009/0129332 A1 | 5/2009 | Dayal et al. |
| 2010/0278123 A1 | 11/2010 | Fong et al. |
| 2011/0034198 A1* | 2/2011 | Chen .................. H04L 1/0029 455/509 |
| 2012/0314619 A1* | 12/2012 | Wiberg .............. H04W 74/006 370/254 |
| 2014/0078980 A1 | 3/2014 | Frenne et al. |
| 2014/0133370 A1 | 5/2014 | Chen et al. |
| 2015/0327255 A1* | 11/2015 | Tamaki ................ H04L 5/001 370/280 |
| 2016/0165606 A1* | 6/2016 | Rashid ................ H04W 4/005 370/329 |

\* cited by examiner

SYSTEMS AND METHODS FOR SELF-CONTAINED AIR INTERFACE PARTITIONS

This patent application claims priority to U.S. Provisional Application No. 62/252,037, filed on Nov. 6, 2015 and entitled "Systems and Methods for Self-Contained Air Interface Partitions", which is hereby incorporated by reference herein as if reproduced in its entirety.

TECHNICAL FIELD

The present invention relates to wireless communications, and, in particular embodiments, to systems and methods for self-contained air interface partitions.

BACKGROUND

In conventional wireless networks, resources of a carrier may be divided into different partitions, and each partition may be assigned to carry data for a different mobile device or group of mobile devices. Control signaling associated with the data may typically be carried in a common control channel, such that mobile devices transmit and/or receive data in different partitions of a carrier according to control signaling in a common control channel of the carrier.

SUMMARY OF THE INVENTION

Technical advantages are generally achieved by embodiments of this disclosure which describe systems and methods for self-contained air interface partitions.

In accordance with an embodiment, a method for wireless communication is provided. In this example, the method includes transmitting a first wireless transmission over a first partition of a carrier supporting a first air interface configuration. The first wireless transmission over the first partition of the carrier includes a first physical data channel and all physical control channel signaling for decoding data carried in the first physical data channel at a receiver of the first wireless transmission. The method further includes transmitting a second wireless transmission over a second partition of the carrier supporting a second air interface configuration. The second wireless transmission over the second partition of the carrier includes a second physical data channel and all physical control channel signaling for decoding data carried in the second physical data channel at a receiver of the second wireless transmission. An apparatus for performing this method is also provided.

In accordance with another embodiment, another method for wireless communication is provided. In this example, the method includes receiving initial access information over an anchor partition of a carrier. The initial access information is for accessing self-contained partitions of the carrier. The method further includes selecting one of the self-contained partitions of the carrier, and accessing the selected self-contained partition of the carrier in accordance with the initial access information received over the anchor partition of the carrier. An apparatus for performing this method is also provided.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

As mentioned above, conventional wireless networks may use a common control channel to carry control signaling for different partitions of a carrier. Accordingly, a mobile device may need to monitor both the resource partition assigned to the mobile device and the common control channel. Next generation wireless networks may have much wider carrier bands than conventional wireless networks, and as a result, there may be relatively wide frequency spacings between resource partitions and a common control channel in a carrier. Monitoring a resource partition and a common control channel that are separated by a wide frequency spacing may be complex from the perspective of the mobile device, particularly when different air interface configurations are used to communicate signaling over the control channel and resource partition.

Aspects of this disclosure communicate wireless signals over multiple self-contained partitions in a carrier such that each partition of the carrier includes all physical control channel signaling required to decode data carried in a physical data channel of the partition. The control signaling may include resource assignment within the partition, modulation and coding scheme indication, reference signal configuration and retransmission information. A downlink transmission over a self-contained carrier partition may also include physical control channel signaling for communicating wireless signals in the uplink direction, such as over uplink physical data and control channels. An uplink transmission over the self-contained partition may include various control signaling related to the downlink transmission, such as channel state information (CSI) reports (e.g., modulation coding scheme (MCS) selection, etc.) and Hybrid Automatic Repeat reQuest (HARQ) signaling (e.g., ACK, NACK, etc.). In an embodiment, a wireless transmission over a partition of a carrier carries HARQ signaling associated with data transmitted over the partition of the carrier. In another embodiment, a HARQ retransmission mode is disabled in a partition, and the partition excludes HARQ signaling. The uplink transmission may also include an uplink data transmission and uplink control signaling related to the uplink data transmission. The uplink transmission may further include scheduling/resource requests for uplink and/or downlink resources. In some embodiments, physical control channel signaling in a partition may exclude initial access information, and the initial access information may be communicated in an Anchor partition. In other embodiments, physical control channel signaling in a partition includes initial access information.

In some embodiments, an anchor partition of a carrier is used to communicate initial access information for self-contained partitions of the carrier. The initial access information may include center-frequencies, bandwidths, and/or air interface configurations of the self-contained partitions. The anchor partition may also carry load indications associated with the self-contained partitions. The load indications may allow mobile devices to identify and/or estimate congestion and/or access probabilities associated with the self-contained partitions. These and other inventive aspects are described in greater detail below.

Figure 1:
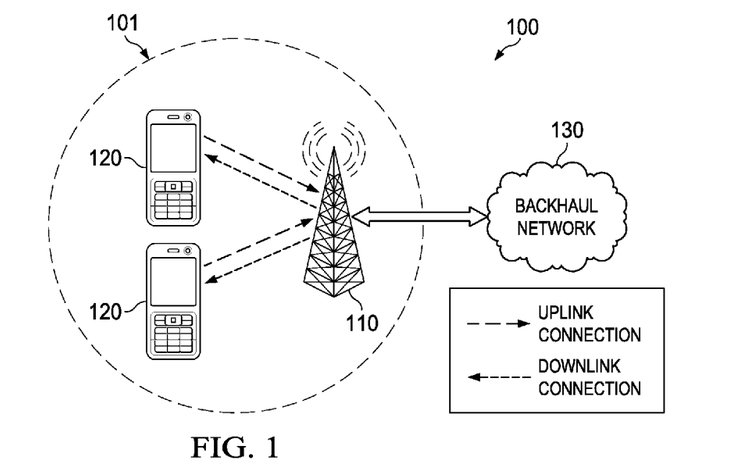
FIG. 1 is a diagram of an embodiment wireless network.

FIG. 1 is a diagram of a wireless network 100 for communicating data. The wireless network 100 includes a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station. The terms "mobile device," "user equipment (UE)," and "mobile station (STA)" are used interchangeably throughout this disclosure. In some embodiments, the network 100 may comprise various other wireless devices, such as relays.

Figure 2:
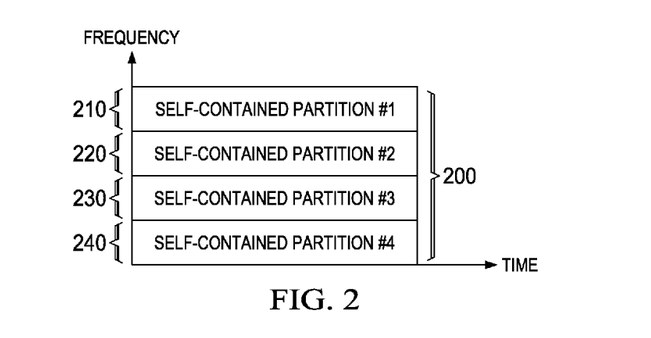
FIG. 2 is a diagram of a carrier that includes self-contained partitions.

Self-contained partitions include all physical control channel signaling for decoding data in a physical data channel of the self-contained partition. In some embodiments, self-contained carrier partitions are positioned in different frequency sub-bands of a carrier. FIG. 2 is a diagram of a carrier 200 that includes a plurality of self-contained partitions 210, 220, 230, 240. Each of the self-contained partitions 210, 220, 230, 240 carries a physical data channel as well as all the physical control channel signaling required to decode data in the corresponding physical data channel. In some embodiments, the physical control channel signaling includes initial access information. The initial access information may be included in a broadcast channel communicated over the self-contained partition. In other embodiments, the initial access information is a priori information of the mobile devices, or is derived from some other source, e.g., an anchor partition that will be described below. Each of the self-contained partitions 210, 220, 230, 240 are communicated over different, non-overlapping, frequency sub-bands of the carrier 200.

The self-contained partitions 210-240 of the carrier 200 may be assigned different air interface configurations. As used herein, the term air interface configuration collectively refers to the subset of parameters used to communicate a signal over an air interface, which may include a subset of physical layer parameters (e.g., sub-carrier spacing, transmission time interval (TTI), transport block duration, sub-frame length, cyclic prefix (CP) length) used to communicate the signal over the air interface, a waveform used to communicate the signal over the air interface, a transmission mode used to transmit the signal over the air interface, an access scheme used to access resources over which the signal is transmitted, a re-transmission scheme used to verify that the signal communicated over the air interface was successfully received, or a combination thereof. As used herein, the term "transport block" refers to entity occupying a duration in time. Given that context, "transport block duration" refers to the duration in time occupied by the transport block.

Because the self-contained partitions 210-240 carry all physical control channel signaling that is needed to decode data in the physical data channel, it may be unnecessary for mobile devices receiving data over different ones of the self-contained partitions 210-240 to monitor a common control channel. This may be advantageous in networks that use different air interface configurations for the different self-contained partitions 210-240, because it allows each mobile device to maintain a single air interface configuration for its assigned self-contained partition 210-240 without having to maintain a second air interface configuration for the common control channel. In some embodiments, signals in different self-contained partitions may be communicated using the same air interface configuration.

Figure 3:
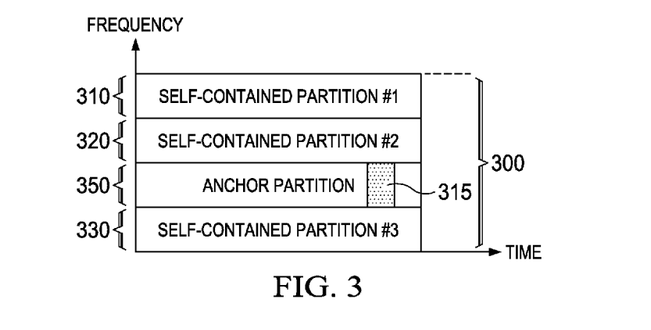
FIG. 3 is a diagram of a carrier that includes an anchor partition and self-contained partitions.

In some embodiments, an anchor partition may be used to provide initial access information to mobile devices entering a network or coverage area. FIG. 3 is a diagram of a carrier 300 that includes an anchor partition 350 and a plurality of self-contained partitions 310, 320, 330. In some embodiments, parameters of the anchor partition 350 are a priori information to mobile devices accessing the network, which allows the mobile devices to access the anchor partition 350 upon entering a network or coverage area associated with the carrier 300. In other embodiments, parameters of the anchor partition 350 are included in a broadcast channel (BCH) indicator 315 communicated in the anchor partition 350.

Initial access information of the self-contained partitions 310, 320, 330 may be communicated in the anchor partition 350. Initial access information communicated in the anchor partition 350 may identify the center frequencies and/or bandwidths of the self-contained partitions 310, 320, 330, as well as air interface configuration parameters of the self-contained partitions 310, 320, 330. In some embodiments, initial access information communicated in the anchor partition 350 may identify a subset of the air interface configuration parameters of one or more of the self-contained partitions 310, 320, 330. In such embodiments, air interface configuration parameters of the self-contained partitions 310, 320, 330 that are not communicated over the anchor partition 350 may be determined by the mobile devices upon accessing the respective self-contained partitions 310, 320, 330, e.g., in a broadcast channel of the self-contained partitions 310, 320, 330.

The anchor partition 350 may also support direct initial access for time-sensitive traffic, and may therefore itself be a self-contained partition in that data can be communicated over a physical data channel in the anchor partition 350 based entirely on physical control channel signaling communicated over the anchor partition 350. In an embodiment, resources of a physical data channel communicated over the anchor partition 350 are accessed in a contention-based manner. In another embodiment, resources of a physical data channel communicated over the anchor partition 350 are accessed in a scheduling-based manner. In yet another embodiment, the anchor partition includes multiple physical data channels, at least one of which includes resources accessed in a contention based manner, and at least another of which includes resources accessed in a scheduling-based manner.

In some embodiments, the anchor partition 350 carries load indicators or access probability indicators associated with the self-contained partitions 310, 320, 330. The load indicators may allow the mobile devices to predict, or otherwise determine, the availability of resources in the self-contained partitions 310, 320, 330. For example, the load indicators may indicate, or otherwise allow the mobile devices to predict, a level of congestion in the self-contained partitions 310, 320, 330. In one embodiment, resources in one or more of the self-contained partitions 310, 320, 330 are accessed in a contention-based manner, and the load indicators specify a parameter (e.g., back-off value, collision probability) that allows a mobile device to estimate an access probability associated with the corresponding partition. In another embodiment, resources in one or more of the self-contained partitions 310, 320, 330 are accessed in a scheduling-based manner, and the load indicators specify an amount, or percentage, of resources that are unoccupied or otherwise available for allocation to the mobile device.

Figure 4:
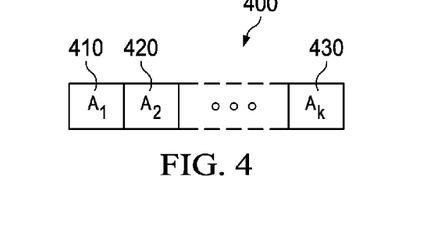
FIG. 4 is a diagram of an embodiment load indicator communicated in an anchor partition.

FIG. 4 is a diagram of an embodiment load indicator 400 communicated in an anchor partition of a carrier. As shown, the load indicator 400 includes a plurality of load indictors 410, 420, 430 for each of the self-contained partitions of the carrier. Each load indicator indicates a traffic load associated with a partition. In one embodiment, each load indicator is two bits, and indicates one of four load situations. For example, a two-bit load indicator may indicate that current load is less than thirty percent of maximum capacity, between thirty and fifty-five percent of maximum capacity, between fifty-five and eighty percent of maximum capacity, or over eighty percent of maximum capacity. Other thresholds/ranges are also possible. In another embodiment, access probability information is sent to the wireless devices to inform them of a projected access probability in one or more partitions. The load indicators and/or access probability information may be unicast to one or more wireless devices. Alternatively, the load indicators and/or access probability information may be multicast or broadcast to multiple wireless devices.

In some embodiments, a mobile device may select a self-contained partition based on the following inequality: $\Sigma_{j=1}^{k-1} A_j \leq r < \Sigma_{j=1}^{k} A_j$, where j is an index associated with a given self-contained partition, k is the total number of self-contained partitions, r is a random variable generated in the mobile device, and $A_j$ is an access probability parameter for a jth self-contained partition. In an embodiment, the random variable r is used to help decide which partition to use. The access probability parameter is a function of the load indicator or the access probability indicator. For example, the load indicator of 00, 01, 10, 11 may be mapped to access probability of 1.0, 0.7, 0.4, 0.1. For another example, an access probability indicator Bj may be mapped to access probability of $2^{Bj}$. The access probabilities indicated may further be normalized. For example, when three access probabilities of 1, 2 and 2 are indicated for three partitions, they may be normalized to 1/(1+2+2)=0.2, 2/(1+2+2)=0.4 and 2/(1+2+2)=0.4, respectively. In some embodiments, the mobile device calculates r based on the following equation: $r=\Sigma_{j=1}^{k} A_j \times \text{rand}()$, where rand( ) is a function to generate a random variable uniformly distributed on the interval [0.0, 1.0].

Figure 5:
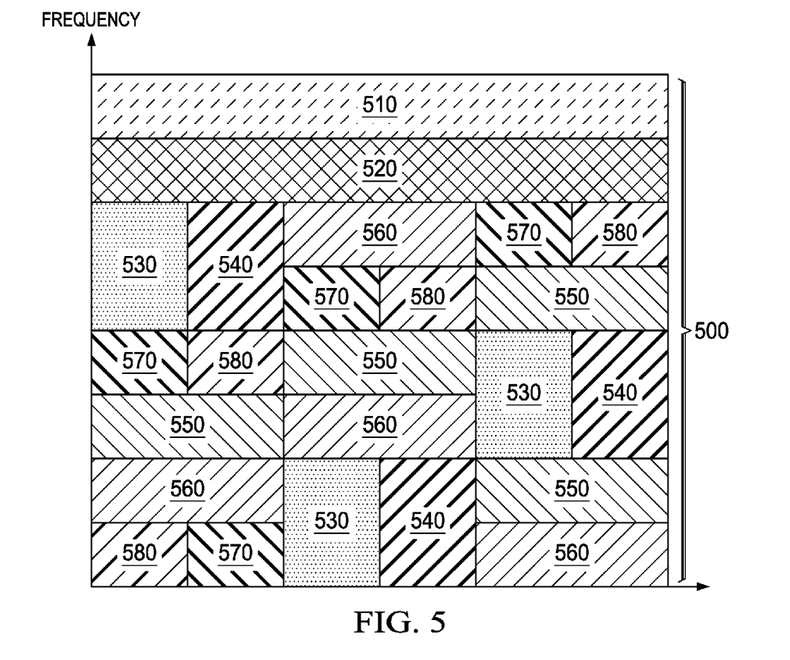
FIG. 5 is a diagram of a carrier that includes physical and logical self-contained logical partitions.
Figure 6:
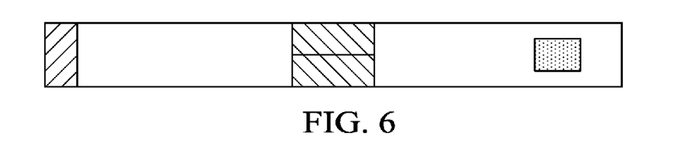
FIG. 6 is a diagram of a logical partition configuration indication.

One or more self-contained carrier partitions may be logical partitions that map to physical resources of the carrier based on different hopping periods and/or hopping patterns. FIG. 5 is a diagram of a carrier 500 includes physical self-contained partitions 510, 520 and logical self-contained partitions 530-580. The physical self-contained partitions 510, 520 map directly to frequency sub-bands of the carrier 500, and the logical self-contained partitions 530-580 are indirectly mapped to sets of physical resources of the carrier 500 based on hopping periods and/or hopping patterns. The logical self-contained partitions 530-580 may be associated with different bandwidths, hopping periods, and/or hopping patterns. The sets of physical resources mapped to each of the self-contained partitions 530-580 may be orthogonal to one another in the time-frequency domain. FIG. 6 is a diagram of a logical partition configuration indication that may be broadcast in a partition. In this example, multiple physical channels are multiplexed into a single partition.

Figure 7:
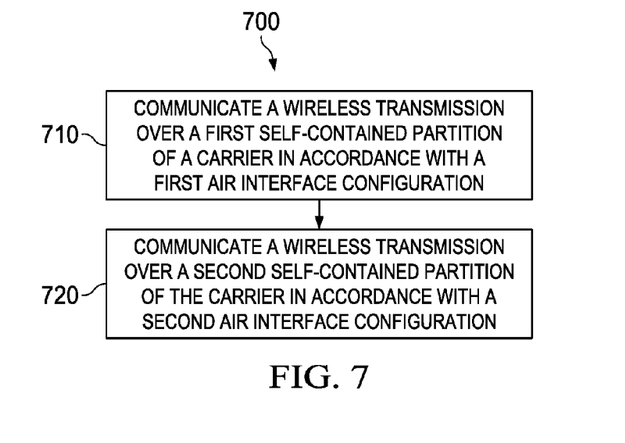
FIG. 7 is a flowchart of an embodiment method for communicating wireless transmissions over self-contained partitions of a carrier.

FIG. 7 is a flowchart of an embodiment method 700 for communicating wireless transmissions over self-contained partitions of a carrier, as may be performed by a base station. At step 710, the base station communicates a wireless transmission over a first self-contained partition of the carrier in accordance with a first air interface configuration. The wireless transmission communicated over the first self-contained partition includes a physical data channel and all the physical control channel signaling used to decode data in the physical data channel communicated over the first self-contained partition.

At step 720, the base station communicates a wireless transmission over a second self-contained partition of the carrier in accordance with a second air interface configuration. The wireless transmission communicated over the first self-contained partition includes a physical data channel and all the physical control channels used to decode data in the physical data channel communicated over the second self-contained partition.

In one embodiment, the first self-contained partition and the second self-contained partition are physical partitions mapped to different frequency sub-bands of the carrier. In another embodiment, the first self-contained partition and the second self-contained partition are logical partitions mapped to sets of resources in the carrier that are orthogonal in the time-frequency domain. In yet another embodiment, the first self-contained partition is a physical partition, and the second self-contained partition is a logical partition.

Figure 8:
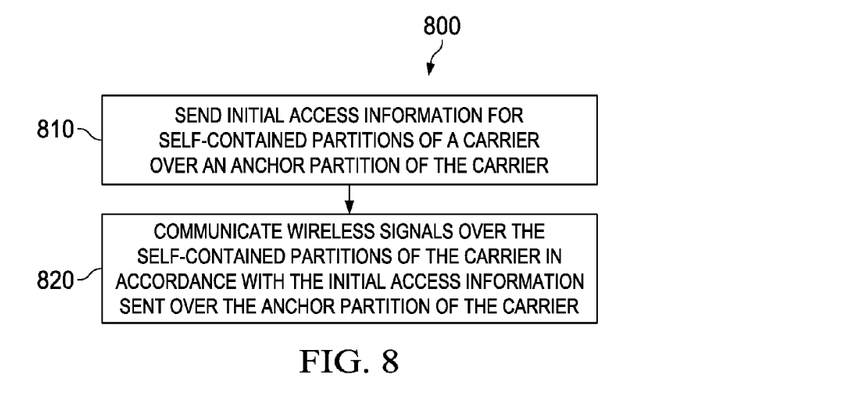
FIG. 8 is a flowchart of an embodiment method for facilitating access to self-contained partitions of a carrier using an anchor partition of the carrier.

FIG. 8 is a flowchart of an embodiment method 800 for facilitating access to self-contained partitions of a carrier using an anchor partition of the carrier, as may be performed by a base station. At step 810, the base station communicates initial access information for the self-contained partitions of the carrier over the anchor partition. The initial access information may identify center frequencies, bandwidths, and/or air interface configurations of the self-contained partitions. In some embodiments, the base station also communicates load indications for the self-contained partitions over the anchor partition. At step 820, the base station communicates wireless signals over the self-contained partitions of the carrier in accordance with the initial access information sent over the anchor partition of the carrier. The wireless transmissions communicated over each of the self-contained partitions includes a physical data channel and all the physical control channel signaling used to decode data in the physical data channel communicated over the corresponding self-contained partition.

Figure 9:
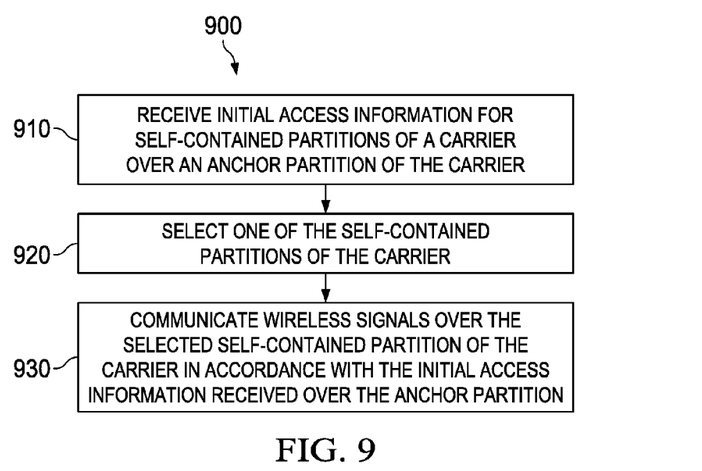
FIG. 9 is a flowchart of an embodiment method for accessing self-contained partitions of a carrier.

FIG. 9 is a flowchart of an embodiment method 900 for accessing self-contained partitions of a carrier, as may be performed by a mobile device. At step 910, the mobile device receives initial access information for the self-contained partitions of the carrier over an anchor partition of the carrier. At step 920, the mobile device selects one of the self-contained partitions of the carrier. In some embodiments, the mobile device selects one of the self-contained partitions based on initial access information and/or load indicators received over the anchor partition. At step 930, the mobile device communicates wireless signals over the selected self-contained partition in accordance with the initial access information received over the anchor partition of the carrier.

Figure 10:
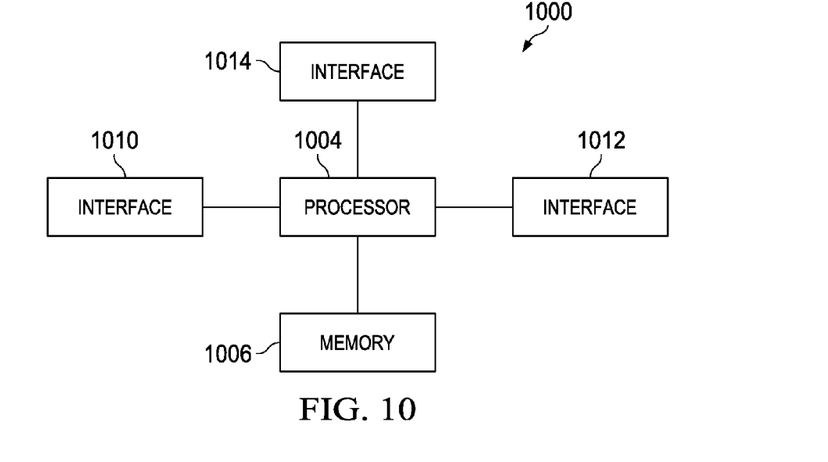
FIG. 10 is a diagram of an embodiment processing system.

FIG. 10 is a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
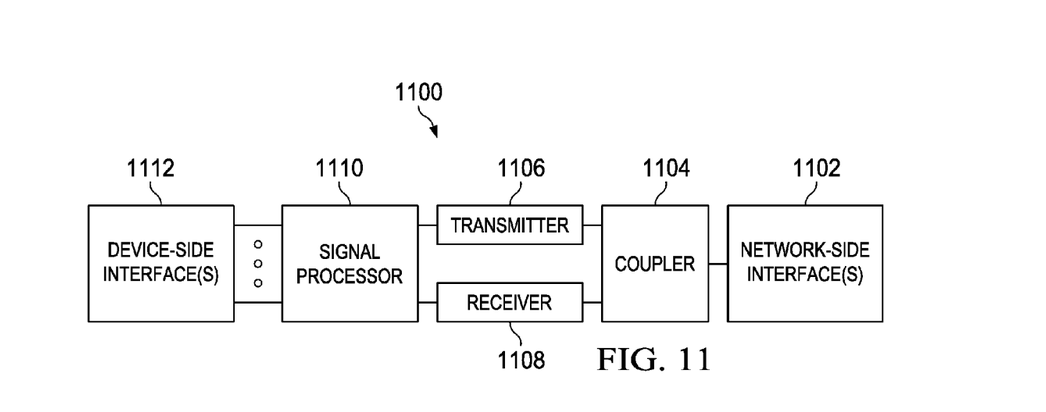
FIG. 11 is a diagram of an embodiment transceiver.

In some embodiments, one or more of the interfaces 1010, 1012, 1014 connects the processing system 1000 to a transceiver adapted to transmit and receive signaling over the telecommunications network. FIG. 11 is a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a sending unit/module, a selecting unit/module, an assigning unit/module, an incrementing unit/module, a decrementing unit/module, and/or an accessing unit/module. The respective units/modules may be hardware, software, or a combination thereof. For instance, one or more of the units/modules may be an integrated circuit, such as field programmable gate arrays (FPGAs) or application-specific integrated circuits (ASICs).

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wireless communication, the method comprising:
    transmitting or receiving, by a base station, a first wireless transmission over a first partition of a carrier supporting a first air interface configuration, the first wireless transmission over the first partition of the carrier including a first physical data channel and physical control channel signaling for decoding data carried in the first physical data channel at a receiver of the first wireless transmission; and
    transmitting or receiving, by the base station, a second wireless transmission over a second partition of the carrier supporting a second air interface configuration, the second wireless transmission over the second partition of the carrier including a second physical data channel and physical control channel signaling for decoding data carried in the second physical data channel at a receiver of the second wireless transmission, wherein the first air interface configuration has a different numerology from the second air interface configuration.

2. The method of claim 1, wherein the first wireless transmission further carries control signaling for establishing initial access to the first partition of the carrier, and the second wireless transmission further carries control signaling for establishing initial access to the second partition of the carrier.

3. The method of claim 1, wherein the first partition of the carrier does not share a common control channel with the second partition of the carrier.

4. The method of claim 1, wherein the first partition and second partition are established over different sub-carrier frequencies of the carrier.

5. The method of claim 1, wherein the first partition and the second partition are established over different logical sub-bands, the different logical sub-bands being mapped to different resource blocks on the carrier.

6. The method of claim 5, wherein the different logical sub-bands have different hopping periods than one another.

7. The method of claim 5, wherein the different logical sub-bands have different frequency hopping patterns than one another.

8. The method of claim 1, further comprising:
    transmitting air interface configuration information over a third partition of the carrier, the air interface configuration information specifying parameters of a first air interface configuration used to communicate the first wireless transmission over the first partition and parameters of a second air interface configuration used to communicate the second wireless transmission over the second partition.

9. The method of claim 8, wherein the air interface configuration information specifies different sub-carrier spacings, symbol durations, cyclic prefix (CP) lengths, transport block durations, subframe length or bandwidths for the first air interface configuration and the second air interface configuration.

10. The method of claim 8, wherein the air interface configuration information specifies different center frequencies for the first partition and the second partition on the carrier.

11. The method of claim 8, wherein the air interface configuration information specifies different waveforms for the first partition and the second partition on the carrier.

12. The method of claim 8, wherein the air interface configuration information specifies different access schemes for the first partition and the second partition on the carrier.

13. The method of claim 1, further comprising:
    transmitting load indicators over a third partition of the carrier, the load indicators indicating an amount of traffic or congestion on the first partition and second partition of the carrier.

14. The method of claim 13, wherein the load indicators are used by user equipments (UEs) to determine access probabilities for the first partition and the second partition of the carrier.

15. The method of claim 1, wherein the same air interface configuration is used to communicate the first wireless transmission over the first partition and the second wireless transmission over the second partition.

16. The method of claim 1, wherein the first wireless transmission further carries Hybrid Automatic Retransmission reQuest (HARQ) signaling associated with data transmitted or received over the first partition of the carrier, and the second wireless transmission further carries HARQ signaling associated with data transmitted or received over the second partition of the carrier.

17. A base station comprising:
    at least one processor; and
    a non-transitory computer readable storage medium storing programming for execution by the processor, the programming including instructions to:
    transmit or receive a first wireless transmission over a first partition of a carrier, the first wireless transmission over the first partition of the carrier including a first physical data channel and physical control channel signaling for decoding data carried in the first physical data channel at a receiver of the first wireless transmission; and
    transmit or receive a second wireless transmission over a second partition of the carrier, the second wireless transmission over the second partition of the carrier including a second physical data channel and physical control channel signaling for decoding data carried in the second physical data channel at a receiver of the second wireless transmission, wherein the first air interface configuration has a different numerology from the second air interface configuration.

18. A method for wireless communication, the method comprising:
    receiving, by a user equipment (UE), initial access information over an anchor partition of a carrier, the initial access information for accessing self-contained partitions of the carrier, each one of the self-contained partitions carrying a different physical data channel and physical control channel signaling for decoding data in the physical data channel carried by the corresponding self-contained partition;

selecting, by the UE, one of the self-contained partitions of the carrier; and accessing, by the UE, physical control channel signaling carried by the selected self-contained partition of the carrier in accordance with the initial access information received over the anchor partition of the carrier, and decoding data in a physical data channel carried by the selected self-contained partition based on the physical control channel signaling carried by selected self-contained partition.

19. The method of claim 18, wherein selecting one of the self-contained partitions of the carrier comprises:

selecting one of the self-contained partitions of the carrier in accordance with load indicators communicated over the anchor partition.

20. A user equipment comprising:

a processor; and a non-transitory computer readable storage medium storing programming for execution by the processor, the programming including instructions to:

receive initial access information over an anchor partition of a carrier, the initial access information for accessing self-contained partitions of the carrier, each one of the self-contained partitions carrying a different physical data channel and all physical control channel signaling for decoding data in the physical data channel carried by the corresponding self-contained partition;

select one of the self-contained partitions of the carrier; and access physical control channel signaling carried by the selected self-contained partition of the carrier in accordance with the initial access information received over the anchor partition of the carrier, and decode data in a physical data channel carried by the selected self-contained partition based on the physical control channel signaling carried by selected self-contained partition.

21. The method of claim 20, wherein the instructions to select one of the self-contained partitions of the carrier include instructions to:

select one of the self-contained partitions of the carrier in accordance with load indicators communicated over the anchor partition.

22. A method for wireless communication, the method comprising:

transmitting or receiving, by a user equipment, a first wireless transmission over a first partition of a carrier in accordance with a first air interface configuration, the first wireless transmission over the first partition of the carrier including a first physical data channel and physical control channel signaling for decoding data carried in the first physical data channel at a receiver of the first wireless transmission, wherein the carrier comprises a second partition supporting a second air interface configuration, the second partition of the carrier is used for transmitting a second wireless transmission including a second physical data channel and physical control channel signaling for decoding data carried in the second physical data channel at a receiver of the second wireless transmission, wherein the first air interface configuration has a different numerology from the second air interface configuration.

23. The method of claim 22, wherein the first wireless transmission further carries control signaling for establishing initial access to the first partition of the carrier, and the second wireless transmission further carries control signaling for establishing initial access to the second partition of the carrier.

24. The method of claim 22, wherein the first partition and the second partition are established over different logical sub-bands, the different logical sub-bands being mapped to different resource blocks on the carrier.

25. A user equipment comprising:

at least one processor; and a non-transitory computer readable storage medium storing programming for execution by the processor, the programming including instructions to:

transmit or receive a first wireless transmission over a first partition of a carrier in accordance with a first air interface configuration, the first wireless transmission over the first partition of the carrier including a first physical data channel and physical control channel signaling for decoding data carried in the first physical data channel at a receiver of the first wireless transmission, wherein the carrier comprises a second partition supporting a second air interface configuration, the second partition of the carrier is used for transmitting a second wireless transmission including a second physical data channel and physical control channel signaling for decoding data carried in the second physical data channel at a receiver of the second wireless transmission, wherein the first air interface configuration has a different numerology from the second air interface configuration.

26. The user equipment of claim 25, wherein the first wireless transmission further carries control signaling for establishing initial access to the first partition of the carrier, and the second wireless transmission further carries control signaling for establishing initial access to the second partition of the carrier.

27. The user equipment of claim 25, wherein the first partition and the second partition are established over different logical sub-bands, the different logical sub-bands being mapped to different resource blocks on the carrier.

* * * * *